United States Patent [19]

Kanaka et al.

[11] Patent Number: 5,233,016

[45] Date of Patent: Aug. 3, 1993

[54] MELT-STABLE COPOLYESTER MOLDING RESINS, PROCESS FOR MAKING SAME, AND MOLDED ARTICLES FORMED THEREOF

[75] Inventors: Keiichi Kanaka; Kenji Hijikata, both of Shizuoka, Japan

[73] Assignee: Polyplastics Co., Ltd., Osaka, Japan

[21] Appl. No.: 813,394

[22] Filed: Dec. 27, 1991

[30] Foreign Application Priority Data

Dec. 28, 1990 [JP] Japan ................ 2-408782

[51] Int. Cl.⁵ ............ C08G 63/00; C08G 67/00; C08G 63/02
[52] U.S. Cl. .................. 528/272; 528/176; 528/271
[58] Field of Search .............. 528/176, 271, 272

[56] References Cited

U.S. PATENT DOCUMENTS

| | | | |
|---|---|---|---|
| 4,067,850 | 1/1978 | Kohler et al. | 528/176 |
| 4,154,918 | 5/1979 | Buxbaum et al. | 528/176 |
| 4,169,868 | 10/1979 | Schreckenberg et al. | 525/439 |
| 4,643,937 | 2/1987 | Dickinson et al. | 428/215 |
| 4,668,764 | 5/1987 | Satou | 528/308.1 |
| 4,692,506 | 9/1987 | Yatsu et al. | 528/296 |
| 4,703,101 | 10/1987 | Singer et al. | 528/87 |
| 4,713,436 | 12/1987 | Downs et al. | 528/295.3 |
| 4,728,719 | 3/1988 | Morris et al. | 528/306 |
| 4,728,720 | 3/1988 | Morris et al. | 528/306 |
| 4,859,760 | 8/1989 | Light, Jr. et al. | 528/45 |
| 4,892,912 | 1/1990 | Hayashi et al. | 525/437 |
| 4,904,747 | 2/1990 | Morris et al. | 525/439 |
| 5,032,669 | 7/1991 | Kantor et al. | 528/176 |
| 5,039,780 | 8/1991 | Hashimoto et al. | 528/194 |

FOREIGN PATENT DOCUMENTS

| | | | |
|---|---|---|---|
| 0043898 | 4/1977 | Japan | 528/176 |
| 0069997 | 6/1977 | Japan | 528/176 |

*Primary Examiner*—John Kight, III
*Assistant Examiner*—T. Mosley
*Attorney, Agent, or Firm*—Nixon & Vanderhye

[57] ABSTRACT

Normally solid, melt-stable copolyester molding resins are formed of the polycondensation reaction product of (a) an aromatic dicarboxylic acid or an ester-forming derivative thereof, (b) an aliphatic dihydroxy compound which includes at least 35 mole % of of units derived from 1,4-cyclohexanedimethanol, and (c) a melt-stable effective amount between 0.1 to 35 mole %, based on the amount of the aromatic dicarboxylic acid, of an ester-forming diol compound of the following formula I:

$$HO-R-O-A-O-R-OH \qquad (I)$$

wherein A is a divalent organic radical having at least one aromatic ring, and R is a divalent organic radical selected from aliphatic hydrocarbon groups having 2 to 8 carbon atoms and polyoxyalkylene groups.

7 Claims, No Drawings

MELT-STABLE COPOLYESTER MOLDING RESINS, PROCESS FOR MAKING SAME, AND MOLDED ARTICLES FORMED THEREOF

FIELD OF INVENTION

The present invention generally relates to polyester molding resins, to processes for making such resins, and to molded articles formed of the same. More specifically, the present invention relates to polycyclohexylenedimethylene terephthalate (PCT) resins which exhibit exceptional melt-stability.

BACKGROUND AND SUMMARY OF THE INVENTION

Thermoplastic polyester resins, for example, polyalkylene terephthalate resins, represented by polyethylene terephthalate (PET) and polybutylene terephthalate (PBT) resins, have conventionally been employed as an engineering plastics material to form a variety of useful articles, such as synthetic fibers, films, sheets and molded components that are used in a number of industrial activities owing to the desirable processability as well as the mechanical, electrical, physical and chemical properties that such resins possess. Continual property improvements are needed, however, as new end-use applications are identified which demand new and-/or enhanced resin properties.

In this regard, polycyclohexylenedimethylene terephthalate (PCT) resin (which is a polycondensation reaction product using 1,4-cyclohexanedimethanol as the alkylene glycol comonomer) has attracted considerable attention as a candidate material to replace PET and PBT in at least some recently identified end-use applications, particularly in view of the greater thermal resistance properties which PCT resin exhibits as compared to PET and PBT resins. That is, since PCT resins typically have melting points as high as between 290° C. to 310° C., they are hopeful candidates for those end-use applications which require high temperature resistance properties that are not satisfied by PET and/or PBT resins.

Conventional PCT resins, however, have poor melt-stability properties. That is, conventional PCT resins usually undergo thermal decomposition when processed in the melt phase (e.g., during melt-blending and/or molding operations) due to the fact that a relatively small temperature differential exists between the melting point and the thermal decomposition point for conventional PCT resins generally. This melt-phase deterioration of conventional PCT resins is of sufficient magnitude which precludes high quality moldings from being obtained.

Furthermore, the melt-instability of conventional PCT resins usually results in the formation of normally solid deposits on processing equipment. For example, when conventional PCT resins are melted and formed into films or sheets by extrusion though a slit shaped nozzle with the film or sheet thereafter being cooled by contact with a chill roll, decomposition products (e.g., terephthalic acid) typically adhere to various surfaces of the processing equipment (e.g., the nozzle, chill roll surface, and the like) with which the resin comes into contact. Use of processing equipment which is contaminated with such decomposition products will thus inevitably result in moldings which have unusually rough surfaces and/or reduced gloss characteristics. To prevent this problem, therefore, the processing equipment must be taken out of service and cleaned at periodic intervals resulting in costly production line "down time" (e.g., not only in terms of lost production but also increased labor costs associated with equipment cleaning).

Prior attempts to solve the problems described above have included incorporating various low molecular weight additives, such as antioxidants and catalyst deactivators, into the PCT resin. However, although the thermal stability associated with the resin is improved somewhat by these additives, there are other problems which the additives cause, such as additive "bleeding" and/or reduced surface gloss. Thus, there still exists a need in this art for improved PCT resins which exhibit improved melt-stability. It is towards fulfilling this need that the present invention is directed.

Broadly, the present invention is directed to novel PCT resins which are the copolymerization reaction product of (a) an aromatic dicarboxylic acid or an ester-forming derivative thereof, (b) an aliphatic dihydroxy compound which includes at least 35 mole % of of units derived from 1,4-cyclohexanedimethanol, and (c) a melt-stable effective amount of a specific ester-forming diol compound.

Units derived from the preferred ester-forming diol compound will be present in the molecular structure of the PCT resins of the present invention in an amount between 0.1 to 35 mole %, based on the amount of the aromatic dicarboxylic acid. In this connection, the ester-forming diol compound which is employed in the present invention is a compound of the following formula I:

$$HO-R-O-A-O-R-OH \qquad (I)$$

wherein A is a divalent organic radical having at least one aromatic ring, and R is a divalent organic radical selected from aliphatic hydrocarbon groups having 2 to 8 carbon atoms and polyoxyalkylene groups. Most preferably, A in the formula I represents groups derived from 2,2-bis(4-phenylene) propane, 4,4'-biphenylene, phenylene, 4,4'-diphenylene and naphthylene, while R most preferably represents groups selected from ethylene and isopropylene.

The aromatic PCT copolyester resins according to the present invention are exceptionally stable in the melt phase and thus can be employed to produce molded articles of surprisingly high quality (e.g., in terms of surface smoothness and gloss characteristics). Moreover, these advantageous qualities are achieved without impairing the other desirable properties of PCT resins generally.

Further aspects and advantages of the present invention will become more clear after careful consideration is given to the following detailed description of the preferred exemplary embodiments thereof.

DETAILED DESCRIPTION OF THE PREFERRED EXEMPLARY EMBODIMENTS

The basic skeleton of the copolyester resin of the present invention is formed by the polycondensation of (a) an aromatic dicarboxylic acid or its ester-forming derivative with (b) an aliphatic dihydroxy compound which is comprised of at least 35 mole % of 1,4-cyclohexanedimethanol. Examples of the aromatic dicarboxylic acids and their ester-forming derivatives that may be used include known aromatic dicarboxylic acids such as terephthalic, isophthalic, naphthalenedicarboxylic and diphenyldicarboxylic acids, as well as their ester-forming derivatives, such as dialkyl esters and diphenyl esters of such dicarboxylic acids and other diacylated compounds. These comonomers can be used either alone or in the form of a mixture of two or more of the same.

The aliphatic dihydroxy compound which is another necessary component which constitutes the basic skeleton of the copolyester resin of the present invention is comprised of at least 35 mole % of units derived from 1,4-cyclohexanedimethanol When the amount of 1,4-cyclohexanedimethanol-derived units is less than 35 mole %, the production of the copolyester resin having high thermal resistance properties is difficult. The amount of 1,4-cyclohexanedimethanol-derived units is more preferably at least 50 mole %, and most preferably at least 70 mole %.

Cis- and trans-stereoisomers of 1,4-cyclohexanedimethanol having different cyclohexane ring structures are known. Either stereoisomer alone, or a mixture of both stereoisomers, may be used in the practice of the present invention. From the viewpoint of the thermal resistance of the resulting copolyester resin, the weight ratio of the cis-isomer to the trans-isomer is preferably between 40:60 to 0:100, and more preferably between 35:65 to 5:95.

Examples of other aliphatic dihydroxy compounds include, in addition to 1,4-cyclohexanedimethanol, substituted and unsubstituted aliphatic dihydroxy compounds such as ethylene glycol, propylene glycol, butanediol, neopentyl glycol, hexanediol, cyclohexanediol, diethylene glycol and triethylene glycol. These compounds can be used either alone or in the form of a mixture of two or more of the same.

A small amount of a trifunctional monomer such as trimellitic acid, trimesic acid, pyromellitic acid, pentaerythritol or trimethylolpropane can be used in combination with the comonomers described above so as to form a copolyester having a branched or crosslinked structure.

Another significant and indispensable comonomer employed in producing the copolyester resins of the present invention is an ester-forming diol compound of the following general formula (I):

HO—R—O—A—O—R—OH     (I)

wherein A represents a divalent organic radical having at least one aromatic ring, and R represents a divalent organic radical selected from aliphatic hydrocarbon groups having 2 t 8 carbon atoms and polyoxyalkylene groups.

Examples of the divalent organic radical A include arylene groups and substituted arylene groups such as phenylene, naphthylene and diphenylene groups and groups of the following formula (II):

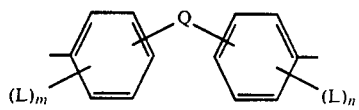

(II)

wherein Q represents oxy, sulfonyl, carbonyl, methylene, dichloromethylene, ethylidene, butylidene, 2,2-propylidene, 1,1-phenethylidene, phenylenebis(2,2-propylidene) and other groups. L represents an alkyl group having 1 to 4 carbon atoms or a halogen and m and n each represent an integer of 0 to 4, inclusive. The divalent organic radicals are preferably 2,2-bis(4-phenylene) propane, 4,4'-biphenylene, phenylene, oxy-4,4'-diphenylene and naphthylene groups.

Examples of the divalent organic radical R in the general formula (I) include ethylene, propylene, isopropylene, butylene, isobutylene, neopentylene, hexylene, polyoxyethylene, polyoxypropylene and polyoxyisoprene groups. Preferred are ethylene and isopropylene groups. Particularly preferred compounds within the definition of formula (I) include 2,2-bis[4-(2-hydroxyethoxy)-phenylene]propane, 2,2-bis[4-(2-hydroxy-1-methylethoxy)-phenylene]propane and 4,4'-bis(2-hydroxyethoxy)biphenyl.

Units derived from the ester-forming diol compound of formula (I) are introduced into the polymer backbone in an amount between 0.1 to 30 mole %, more preferably between 0.5 to 20 mole %, and most preferably between 2.0 to 15 mole %, based on the aromatic dicarboxylic acid. When these units are incorporated at levels below 0.1 mole %, little (if any) melt-stabilizing effects are achieved. On the contrary, when incorporated at levels which exceed 30 mole %, the melting point and crystallinity of the resulting resin are significantly changed which deleteriously affect the thermal stability properties.

In the present invention, a novel polyester resin having high melt-stability can be obtained by introducing a small amount of the specified comonomer component (c) during the production of the polyester mainly comprising the dicarboxylic acid component (a) and the aliphatic dihydroxy compound (b) comprising at least 35 mole % of 1,4-cyclohexanedimethanol. Even when such a resin is melted at an elevated temperature suitable for molding, such as 330° C., in air for 20 minutes, the formation of solid decomposition products is at most 0.10% by weight, usually not more than 0.07% by weight, based on the weight of the resin. Thus, the amount of decomposition products formed is far smaller than that formed when no comonomer component (c) is used. As a result, problems such as deposition of solid decomposition product can unexpectedly be minimized (if not eliminated entirely).

The copolyester resin can be produced by conventional processing techniques used to produce polyester resins generally. That is, the monomers can be heated to between about 150° to 280° C. in the presence of a catalyst to perform esterification or transesterification, with polycondensation thereafter being conducted under reduced pressure while excess monomers or eliminated components are removed (e.g by distillation). The catalysts usable in this reaction are known catalysts usually used for the polycondensation of polyester resins, such as tetraalkoxy titaniums, e.g. tetrabutoxytitanium, metal salts of titanium oxalate, e.g. potassium titanium oxalate, tin compounds, e.g. dibutyltin oxide and dibutyltin laurate, metal acetates, e.g. zinc, lead, manganese and calcium acetates, and antimony compounds, e.g. antimony trioxide. They can be used either alone or in combination of two or more of the same.

The molecular weight of the polymer (including oligomer) obtained by melt-polymerization or solution-polymerization techniques can be increased by so-called solid phase polymerization wherein the polymer is treated in a vacuum or under an inert gas for a selected time period at a high temperature which is controlled so that the polymer particles do not fuse. The resulting molecular weight in terms of intrinsic viscosity is preferably between 0.6 to 1.8, particularly 0.7 to 1.5.

The copolyester of the present invention exhibits excellent properties without the need to further incorporate other additives. Particularly, the copolyester exhibits an improved thermal stability comparable to that obtained when conventional antioxidants are used. Accordingly, from the viewpoint of inhibiting additive "bleeding", it is recommended that an antioxidant (which usually easily bleeds out of the resin) not be employed as an additive to the resins of this invention. However, suitable additives which do not inhibit the principal object of the present invention (i.e., enhanced melt-stability) can be used for improving other properties of the resin, if necessary. Typical additives include thermal stabilizers, ultraviolet absorbers, antistatic agents, flame-retardants, flame-retarding assistant, colorants such as dyes, or pigments, slip additives or lubricants for improving fluidity and mold release properties, crystallization accelerators (nucleating agents) and inorganic filler materials.

The resins of the present invention may further contain a small amount of another thermoplastic resin, provided that the benefits obtained by the invention are not inhibited. The thermoplastic resin usable herein may be virtually any resin which is stable at high temperature, and which may include polyolefinic polymers, polyamides, polycarbonates, ABS, polyphenylene oxides, polyalkyl acrylates, polyacetals, polysulfones, polyether sulfones, polyether imides, polyether ketones and fluororesin. These thermoplastic resins can be used either alone or in the form of a mixture of two or more of the same.

The polyester resin of the present invention can be molded by any conventional melt-molding techniques. The intended effect of the invention can be exhibited particularly during the extrusion-molding of films, sheets, monofilaments, fibers, rods and hollow pipes, particularly films and sheets. The extrusion-molding of films or sheets is conducted by either the inflation method or the T-die method. In this regard, virtually no thermal decomposition products adhere to the film-forming equipment (e.g., the slit-shaped nozzle, cooling roller and guide bar) such that the surface of the produced film or sheet is of acceptable quality.

The moldable copolyester resin of the present invention has remarkably improved thermal stability without substantial detriment to its thermal resistance. It forms only minimal (if any) amounts of thermal decomposition products, such as terephthalic acid, in the course of molding film or sheet products. Therefore, molded articles having excellent processability and high quality can be produced.

The following non-limiting Examples will further illustrate the present invention.

EXAMPLES

The melt-stability of the resin was evaluated in the following Examples by quantitatively determining the normally solid (i.e., at ambient temperature) decomposition products which formed in the melting step (330° C., 20 min.) and then measuring the time needed for a 10% weight reduction of the resin at 350° C. to occur. The quantitative determination was conducted by melting about 5 grams of the polymer on a closed hot plate at 330° C. for 20 minutes. Any solid decomposition products (sublimates) formed from the molten polymer were solidified by cooling and collected. The amount of the decomposition products was noted as the formation rate of molten decomposition products in terms of the percent by weight based on the initial polymer weight.

Examples 1 to 3

100 mol of (a) dimethyl terephthalate, and (b) 1,4-cyclohexanedimethanol (ratio of cis-isomer/trans-isomer=25/75) and (c) ethylene oxide (2 mol) adduct of bisphenol A in the amounts specified in Table 1 were fed together with 0.036 mol of tetrabutoxytitanium catalyst into a reactor provided with a stirrer, nitrogen-inlet tube and reflux distillation tube and stirred at 150° C. in a nitrogen stream for 1 hour. The temperature was slowly elevated and the mixture was stirred at 180 to 270° C. for 3 hours. The introduction of nitrogen gas was stopped and the pressure in the reactor was reduced while the temperature was slowly elevated to 315° C. to attain 0.1 mm Hg after 1 hour. Stirring was continued for 3 hours at this pressure to obtain a polymer having a comonomer introduction rate noted in Table 1. The intrinsic viscosity, melting point, melt decomposition product forming rate at 330° C. and time taken to achieve a 10% weight reduction at 350° C. are given in Table 2.

Examples 4 to 8

The same procedure as that of the Example 1 was repeated using 100 mol of (a) dimethyl terephthalate, 120 mol of (b) 1,4-cyclohexanedimethanol, 10 mol of (c) each comonomer listed in Table 1 and 0.036 mol of tetrabutoxytitanium as the catalyst to obtain a polymer having comonomer introduction rate given in Table 1. The intrinsic viscosity, melting point, melt decomposition product forming rate at 330° C. and time taken to achieve a 10% weight reduction at 350° C. are given in Table 2. Films were produced from these copolymers and the adhesion os solids was examined in the same manner as that of the Example 1 to obtain the results given in Table 2.

Examples 9 and 10

The same procedure as that of the Example 1 was repeated using 100 mol of (a) dimethyl terephthalate, 120 mol of (b) 1,4-cyclohexanedimethanol having a cis-isomer to trans-isomer ratio specified in Table 1, 10 mol of (c) ethylene oxide (2 mol) adduct of bisphenol A and 0.036 mol of tetrabutoxytitanium as the catalyst to obtain a polymer having a comonomer introduction rate given in Table 1 and properties given in Table 2. Values indicating the melt decomposition behavior of the polymer and the results of the evaluation of solid adhesion observed in the film formation are also given in Table 2.

Comparative Example 1

Polycyclohexylenedimethylene terephthalate homopolymer was produced under the same condition as those of the Examples 1 to 10 except that no component (c) was added. The melt decomposition product forming rate at 330° C. and the time taken to achieve 10% weight reduction at 350° C. were determined. The solids adhering to the roll surface during the production of a film by the T-die method were examined. The results are given in Table 2. The adherent solids substantially were comprised of terephthalic acid.

Comparative Example 2

A polymer was produced in the same manner as that of the Example 2 except that 10 mol of triethylene glycol which is outside the scope of the definition of the ester-forming diol compound used as component (c) according to the present invention was used as the comonomer component, and was then evaluated in the same manner noted previously. The results are given in Table 2.

TABLE 1

| | (c) Comonomer (HO—R—O—A—O—R—OH) | | | | (b) Diol component 1,4-cyclohexane-dimethanol | |
|---|---|---|---|---|---|---|
| | A | R | feed (mol) | comonomer introduction rate* | cis/trans ratio | feed (mol) |
| Example | | | | | | |
| 1 | bisphenol-A type (–C6H4–C(CH3)2–C6H4–) | —CH2CH2— | 2.5 | 2.5 | 25/75 | 127.5 |
| 2 | " | " | 10 | 10 | 25/75 | 120.0 |
| 3 | " | " | 20 | 20 | 25/75 | 110.0 |
| 4 | " | —CH2—CH(CH3)— | 10 | 10 | 25/75 | 120.0 |
| 5 | –C6H4– | —CH2CH2— | 10 | 10 | 25/75 | 120.0 |
| 6 | –C6H4–C6H4– | " | 10 | 10 | 25/75 | 120.0 |
| 7 | –C6H4–O–C6H4– | " | 10 | 10 | 25/75 | 120.0 |
| 8 | naphthalene-2,6-diyl | " | 10 | 10 | 25/75 | 120.0 |
| 9 | bisphenol-A type | " | 10 | 10 | 10/90 | 120.0 |
| 10 | " | " | 10 | 10 | 30/70 | 120.0 |
| Comp. Ex. | | | | | | |
| 1 | — | — | — | — | 25/75 | 130.0 |
| 2 | —CH2CH2— | —CH2CH2— | 10.0 | 2.8 | 25/75 | 120.0 |

*(mole % base on terephthalic acid residue) determined according to $^1$H-NMR spectrometry

TABLE 2

| | Melting point (°C.) | Intrinsic viscosity | Rate of formation of melt decomposition product of pellets** (% by wt.) | Time taken for 10% weight reduction*** (min) | Adhesion to cooling roll in film formation | |
|---|---|---|---|---|---|---|
| | | | | | after 0.5 h | after 2 h |
| Example | | | | | | |
| 1 | 268 | 1.0 | 0.09 | 21.5 | very small | small |
| 2 | 266 | 1.1 | 0.05 | 20.6 | none | none |
| 3 | 250 | 1.1 | 0.05 | 26.7 | " | " |
| 4 | 265 | 1.0 | 0.06 | 20.1 | " | " |
| 5 | 271 | 0.9 | 0.05 | 22.6 | " | " |
| 6 | 269 | 0.9 | 0.05 | 23.0 | " | " |
| 7 | 268 | 1.0 | 0.07 | 20.9 | " | very small |
| 8 | 269 | 1.2 | 0.06 | 21.9 | " | " |
| 9 | 276 | 1.1 | 0.05 | 27.0 | " | none |

TABLE 2-continued

| | Melting point (°C.) | Intrinsic viscosity | Rate of formation of melt decomposition product of pellets** (% by wt.) | Time taken for 10% weight reduction*** (min) | Adhesion to cooling roll in film formation | |
|---|---|---|---|---|---|---|
| | | | | | after 0.5 h | after 2 h |
| 10 Comp. Ex. | 261 | 1.1 | 0.05 | 21.0 | " | " |
| 1 | 277 | 1.0 | 0.15 | 15.0 | remarkable adhesion of white substance | remarkable adhesion of white substance |
| 2 | 265 | 1.0 | 0.14 | 15.2 | remarkable adhesion of white substance | remarkable adhesion of white substance |

**melting was conducted at 330° C. for 20 min.
***melting was conducted at 350° C.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A melt-stable copolyester molding resin which consists essentially of the copolymerization reaction product of (a) an aromatic dicarboxylic acid or an ester-forming derivative thereof, (b) an aliphatic dihydroxy compound which includes at least 35 mole % of units derived from a mixture of cis- and trans-isomers of 1,4-cyclohexanedimethanol having a ratio of the cis-isomer to the trans-isomer of between 35:65 and 5:95, and (c) a melt-stable effective amount between 0.1 to 35 mole %, based on the amount of the aromatic dicarboxylic acid, of an ester forming diol compound of the following formula I:

HO—R—O—A—O—R—OH    (I)

wherein A is a divalent organic radical having at least one aromatic ring, and R is a divalent organic radical of an aliphatic hydrocarbon group having 2 to 8 carbon atoms or a polyoxyalkylene group.

2. The copolyester resin as in claim 1, wherein A in the formula I is 2,2-bis(4-phenylene) propane, 4,4'-biphenylene, phenylene, 4,4'-diphenylene or naphthylene, and R is ethylene or isopropylene.

3. The copolyester resin according to claim 1, wherein solid deposits formed by melting the resin at 330° C. for 20 minutes is 0.10% or less by weight based on the weight of the resin.

4. A molded article which consists essentially of the resin according to claim 1 or 2.

5. A molded article as in claim 4, which is in the form of a film or sheet.

6. A process for making a melt-stable copolyester molding resin which comprises the steps of subjecting a comonomeric mixture consisting essentially of (a) an aromatic dicarboxylic acid or an ester-forming derivative thereof, (b) an aliphatic dihydroxy compound which includes at least 35 mole % of units derived from a mixture of cis- and trans-isomers of 1,4-cyclohexanedimethanol having a ratio of the cis-isomer to the trans-isomer of between 35:65 and 5:95, and (c) a melt-stable effective amount between 0.1 to 35 mole %, based on the amount of the aromatic dicarboxylic acid, of an ester forming diol compound of the following formula I:

HO—R—O—A—O—R—OH    (I)

wherein A is a divalent organic radical having at least one aromatic ring, and R is a divalent organic radical of an aliphatic hydrocarbon group having 2 to 8 carbon atoms or a polyoxyalkylene group.

7. The method as in claim 6, wherein A in the formula I is 2,2-bis(4-phenylene) propane, 4,4'-biphenylene, phenylene, 4,4'-diphenylene or naphthylene, and R is ethylene or isopropylene.

* * * * *